Patented Nov. 29, 1938

2,138,049

UNITED STATES PATENT OFFICE 2,138,049

DRYING PIGMENTS

Vincent C. Vesce, New York, N. Y., assignor to Harmon Color Works, Inc., Brooklyn, N. Y., a corporation of New York No Drawing. Application January 21, 1937, Serial No. 121,664

7 Claims. (Cl. 134—58)

This invention or discovery relates to drying pigments; and it comprises a method of dehydrating wet pigment pastes, slurries and press cakes to secure free-running dry powders preserving the original particle size and original pigmentary value, which comprises forming an admixture of wet pigment with water in amount sufficient to produce a relatively thin slurry, agitating to produce a smooth colloidal suspension, adding to the slurry a small amount of a water-immiscible volatile liquid, homogenizing and emulsifying the compound aqueous suspension thereby produced by vigorous agitation, and exposing said homogenized suspension to heat in thin layers, whereby the liquids are evaporated and removed, yielding a fine, pulveriform, non-caking pigment preparation; all as more fully hereinafter set forth and as claimed.

An object achieved in the present invention is the direct conversion of wet pigments into dry fine grained powders without a comminuting grinding; the original discrete individual particles of the wet pigment reappearing in the dry pigment and the pigment being readily milled into viscous varnish and paint vehicles. Obviating mechanical comminution of hard, dried pigment gives not only an economy in costs but better products. In fine grinding hard, dried pigment, new fragmentary particles are produced and these rarely have the same pigmentary value as the original particles.

In the manufacture of pigments and pigment toners, wet precipitates, pastes and slurries are produced by various chemical reactions, and in these the discrete individual particles are fine and are of tolerably uniform size; giving the pigment an evenness, or "levelness", of appearance which it is desirable to preserve in the dry commercial pigment. This, however, is not done in the usual practice. In the ordinary practice the wet materials are filter pressed to get rid of as much water as possible and the resulting press cake is dried in an oven. As is usual with moist hydrated materials of any kind, in drying the particles tend to stick together and the press cake generally dries to hard lumpy masses; there are clods, so to speak. Sometimes much of the dried material is hard, horny or leathery. Fine grinding of the dried press cake is done in impact mills, pebble mills or the like and generally requires considerable time; and particularly when the dried cake is horny or leathery and not readily frangible. The pigmentary value of the material usually changes materially in drying and grinding, nor is the change for the better. Even where a comminuted product is obtained with the particles averaging the same order of fineness as those in the original press cake, a result seldom secured, the pigmentary value is not the same. Mechanical grinding inherently produces particles having a wide range of sizes from coarse to fine, as contrasted with the more or less uniform all-fine size range of the particles in a freshly precipitated wet product.

The time and energy consumed in dry grinding are often considerable factors, as is the usual necessity of thorough cleaning of equipment between batches of different pigments. In making paints and pigmented lacquers there is a second grinding operation, the dry powder being incorporated with the viscous vehicle in paint mills of various types. Sometimes in the second grinding there is also a considerable expenditure of time and energy. For example, certain blue iron ferrocyanide pigments, dried and fine ground in the ordinary way, have been known to require as much as five days in securing a smooth dispersion in grinding with paint vehicles in a pebble mill. Paint mills are always necessary in incorporating dry pulverulent pigment into viscous liquids, like linseed oil and varnish bases. Usually these mills have rubbing elements of some sort; e. g. closely spaced discs of stone or metal with relative rotation. Their primary function is not one of comminution but of incorporation. Nevertheless considerable mechanical force and pressure are often necessary to work the pigment into vehicles, as in the case of the blue pigments just mentioned. Naturally, the better the physical form of the pigment, the less the time and energy required.

I have discovered that if these wet pigment preparations be made into a thin slurry with water and a small amount of a volatile, immiscible solvent (toluol, benzol, light petroleum oils, etc.) incorporated by an emulsifying stirring, the resultant mixture dries more quickly than a press cake, although the amount of water present is considerably greater. And the dried product is not caked or lumpy; it breaks down into the original pigmentary particles at a touch. No mechanical comminution is necessary and the dry powder can be readily and quickly incorporated in the usual viscous vehicle. When so incorporated, the pigmentary value of the dispersed particle is the same as that in the original wet pigments. Any commercial pigment has a rated "oil absorption" value and with any pigment I use an amount of volatile liquid proportional to this value. With less liquid the material may dry lumpy; with more there is no advantage. The slurry may become curdy and lumpy and drying becomes irregular and erratic. The rationale is not wholly clear. In the original wet pigment, and in the slurry produced in breaking up a press cake in water, there are discrete particles with hydrated surfaces forming a two-phase system; solid particles in a continuous aqueous liquid. Presuming a smooth and even slurry, made by breaking up a press cake in water, each particle may be regarded as isolated from its neighbors by intervening water. If now a volatile immiscible liquid, such as toluol, is emulsified in this suspension, apparently the liquid suspensoid seeks the solid suspensoid; possibly replacing the aqueous layer in direct contact with the particle. Although there are three components, the result practically is a two-phase system. In any case, although toluol can form an azeotropic vapor mixture with water, in the first stages of drying in the present invention the vapors expelled are water; this probably being water between the particles. Later, after the bulk of the water is evaporated, the odor of toluol begins to be noticeable. I consider it probable that in the last stages the hydrated surfaces of the particles are dehydrated with the aid of clinging toluol. This, however, is speculation and I content myself with noting the facts.

While the present invention is applicable to the drying of any fine grained wet pigment preparation, I consider it of maximum utility in drying toner pigments; pigments intended to impart vivid hues to paint, lacquer and printing ink compositions, and usually used in conjunction with ordinary pigments of duller hue. These toners are frequently insoluble azo dyestuffs, often resulting from the coupling of beta naphthol with various amino groups. Sometimes they are produced in an unmixed state; sometimes there is cold precipitated or fine ground mineral matter present to serve as a filler or body. These azo preparations are particularly apt to dry down to hard, horny preparations and in comminution there are fracture faces exposed so that the fine ground dried pigment is ordinarily paler. As the value of these toners resides in their vividness of color, this is a considerable disadvantage.

In the ordinary routine of an operation embodying said discovery, treating an azo pigment, the wet preparation is filter pressed to form a cake, being thereby freed of much of the mother liquor. The cake may be washed in the usual way. The cake is then broken up with sufficient water to give a smooth rather than even slurry and into this slurry is incorporated the volatile solvent with vigorous agitation. Agitation should be long enough to ensure complete emulsification. The emulsified mixture, which is commonly a little thicker in consistency than the slurry, is placed in pans and the mixture dried in a current of hot air, no special expedients being necessary. Drying takes place rather quickly and the dried material breaks down into a fine powder on a touch. Incorporated into oil or varnish, an operation easily performed, the color value of the suspended pigment is about the same as that in the original wet mix. This is an item of considerable value since it enables the color value of a final paint or varnish to be adjusted in the making of the pigment. It contributes considerably towards standardized results.

To recapitulate, in the present invention dry pigments are obtained in such condition that comminution is neither necessary nor desirable; the powders having substantially the fine regular texture, brilliant color and evenness of grain size of the solid in a freshly precipitated mass of pigment. The powders are much finer and softer than those produced by mechanical comminution and they mill into viscous vehicles such as paints much more readily.

In the first step of making a slurry the amount of water to be added is about that which will give a mayonnaise consistency. Mostly it is desirable to make a press cake of these preparations to get rid of mother liquor and wash the press cake and in such a case the press cake is broken up in a little water. Sometimes, however, an original watery paste, produced after the chemical reactions is directly used. These may have the necessary ratio of water to solids to give a suspension in which the volatile solvent can be emulsified. Or, sometimes, it is feasible to use less pressure on a filter press producing a sufficiently soft and watery cake.

The process is quite generally applicable to pigments produced in the wet way, giving in all cases a dry product which is definitely superior to mechanically comminuted products. With some pigments, to get a dry product retaining to the fullest extent the fine state of subdivision and pigmentary value of the original press cake, it is better to proceed according to the process disclosed and claimed in my copending application Serial No. 9,325, filed March 4, 1935. In the process of that application I break up a pigment press cake in an abundance of water to make a slurry with every particle widely separated from its neighbors. This aqueous slurry is fed gradually into a boiling body of liquid immiscible with water and the water is evaporated from each particle as an azeotropic vapor mix. At any instant the ratio of immiscible liquid to water is very great. The particles do not come into contact before the water is removed. This accomplishes the results sought, but it involves the use of a still. In the present invention the ratios are, so to speak, reversed: there is much more water than immiscible liquid.

My process is eminently suited for large scale commercial operation. Not much additional equipment or labor is required, and conventional drying ovens can be used.

Pigment press cakes, which are used as a starting material for the invention, are the result of filter-pressing the precipitated (or otherwise formed) pigment product, and washing. The amount of water in a press cake depends somewhat on the pressure used in filtering, and more upon the character of the pigments. Press cakes of certain pigments, such as peacock blue lakes, Indo maroon and many inorganic pigments such as chromium oxide, usually have a relatively high solid-to-water ratio, while press cakes of other pigments, e. g. topaz toner, have a low ratio. Similar considerations apply to other pigment pastes. Whether the solid content of a press cake be large (e. g. 20 per cent by weight) or small (e. g. 10 per cent) it is always necessary, in working under the present invention, to produce a slurry containing a substantially greater amount of water than exists in an ordinary press cake. This is because any given press cake is a mass of wet particles with all the free-draining water squeezed out from between them, leaving them as nearly in contact as may be. It is necessary to have water present in order to separate or isolate the particles, prior to emulsification with naphtha.

Among the pigments to which the present process can be applied to advantage are: organic pigment toners in general, such as lithol toners;

also Persian orange lakes, alizarine lakes, peacock blue lakes, geranium lakes, maroon toners and lakes, etc.

In an example of a specific embodiment of my invention, directed to producing an improved dry pigment from lithol rubine toner (the calcium salt of para-toluidine-meta-sulfonic acid-azo-beta-hydroxy-naphthoic acid), a batch of 300 kg. of a freshly produced press cake of this pigment, containing some 17 per cent solids by weight, was placed in a container equipped with an efficient stirring device. To this batch was added 80 kg. of water with agitation. A smooth slurry, resembling mayonnaise, was formed, containing about 13 per cent solids. The agitator was speeded up, and there was slowly added 50 liters of a naphtha having a narrow boiling range. In a short time all the naphtha was absorbed, the slurry or emulsion having a uniform watery appearance. The slurry was now poured into shallow trays to a depth of around 2 inches, and placed in a heated drying oven having means for circulating warm air over the trays. The temperature at the trays was maintained at a temperature around 70° C. which is similar to that employed in directly drying wet pastes by known methods. In the course of time the water and the naphtha were completely removed, leaving in the trays a fluffy, fine soft mass of dry pigment.

In another example, (2), relating to drying topaz toner (the calcium salt of aniline-azo-beta-hydroxy-naphthoic acid, a batch of 300 kgm. of the freshly produced press cake containing 12 per cent solids by weight, was placed in an apparatus as described in connection with Example 1, and 100 kgm. of water was added while stirring. A smooth, thin mass resulted. When the mass became perfectly smooth, the agitator was speeded up, and 40 liters of naphtha gradually introduced. A smooth emulsion was formed. This was placed in trays and dried at 55° C., yielding a fine fluffy brilliant product.

The amount of water to be added in making up the dilute suspension, and the amount of immiscible liquid added, can be varied within a considerable range. Ordinarily for a given pigment, I ascertain by trial the least amount of water and of immiscible liquid which will give good results for that pigment, and use such proportions in commercial operation. There should be enough water in the dilute suspension to keep the pigment particles well separated, and there should be at least enough naphtha or other immiscible liquid to satisfy the oil or solvent absorption value for that particular pigment. (Oil absorption values for pigments can be determined by well known standardized methods. The values for many pigments have been worked out and tabulated.) The weight of immiscible liquid added is ordinarily roughly equal to the weight of pigment (dry basis). In some cases it can be much less. Thus in Example 2 ante the weight of naphtha added can be cut down ten-fold, i. e. to 5 liters, with no difference in the final product. The weight of liquid necessary is rarely more than twice the weight of the pigment. The best amount of liquid is usually that which is just enough to form an emulsion with the water-pigment mass. If an inordinately large quantity of naphtha be added to the wet slurry, a phenomenon known as "shedding" takes place; the water separates out leaving the pigment in suspension. This is undesirable because in such cases the pigment particles clump together and dry down in clods in a way analogous to the drying of wet press cakes.

The weight of water added or present is usually somewhat more than that of the immiscible liquid. Sometimes, the charge of immiscible liquid selected may not be completely absorbed in the aqueous slurry, in which case I add more water after addition of the immiscible liquid.

If desired, the emulsion formed as described can be dried otherwise than on trays, e. g. spray-dried, drum-dried, etc.

With some pigments it is best to form the water-naphtha suspension with the aid of a colloid mill. Sometimes a better emulsion is formed if some or all the naphtha is added to the press cake and admixed therewith prior to addition of water.

For the immiscible liquid, a narrow-cut naphtha (a naphtha having a narrow boiling point range) is especially useful being applicable to all sorts of pigments. Other liquids can be used, such as benzene, toluene, gasoline, "Stoddard's solvent" etc. These are all volatile organic liquids. Care should be taken to select a liquid which is inert with respect to the pigment; that is, which does not cause bleeding of the pigment or other change therein. Carbon tetrachloride gives excellent results with many pigments and has the advantage of reducing fire hazard. It is mostly desirable to use a volatile solvent free of "heavy ends"; greasy not very volatile oils which would remain with the pigment. However, sometimes but not very often, a greasy pigment is desired. The "gummy ends" of turpentine can be used with advantage as the immiscible liquid in certain cases.

Examples 1 and 2 ante show the application of the invention to the important class of precipitated soluble azo dyes. Below are additional examples of specific embodiments of the invention, illustrating its application to various types of pigments, and illustrating optional procedures for forming the suspensions and emulsions pior to drying.

Examples 3 and 4 are directed to the drying of pigments of the basic color class; toners of precipitated dyes in the triphenylmethane series.

3. A batch of 150 kg. of a press cake of pure blue toner (a pure phosphotungstic acid precipitate of the dyestuff known as Victoria Pure Blue BO) having 18 per cent solid content, was placed in an agitator-mixer and 75 liters water added with agitation. A very smooth slurry was formed. To this was added gradually 55 liters naphtha, and the agitator speeded up until all the naphtha was absorbed. The resulting extremely smooth slurry was placed in trays and dried in an ordinary pigment-drying oven at 55° C., with circulation of air over the trays. The product was a fine, soft, brilliant blue mass, preserving substantially the pigment size and pigmentary value of the original wet press cake.

4. Iridescent violet toner (a tartar emetic tannic acid precipitation of methyl violet dye containing a small amount of sub-stratum, e. g. hydrated alumina and blanc fixe) has the property of forming on agitation a thin watery slurry of mayonnaise consistency, even though having a relatively high solid content (e. g. 23 per cent). A thin, free-running, mayonnaise-like aqueous suspension of this pigment was produced in an agitator, and to 150 kgm. of the slurry was added 35 liters of naphtha. The naphtha was incorporated by strong agitation and the emulsion dried as described in the preceding examples, yielding an excellent soft product.

Examples of drying insoluble azo toner pigments are as follows:

5. A watery slurry of thin, smooth, free-flowing consistency was formed by agitating an aqueous mass of toluidine maroon toner (a monoazo insoluble pigment toner produced by coupling metanitroparatoluidine with meta-nitrilid-betahydroxy-naphthoic-acid) having 15 per cent solid content. Into 2850 grams of the slurry was incorporated 350 ccm. naphtha and a smooth emulsion formed; strong agitation being used. The emulsion was dried at 70° C., giving a fluffy, fine soft mass.

6. A 33 kgm. batch of a 16 per cent press cake of deep para toner (an insoluble azo pigment toner made by coupling diazotized paranitraniline with betanaphthol in the presence of a small quantity of monosulfonic acid F to make the color deeper) was admixed with 7 liters water, forming a smooth suspension. To this was added 8 liters naphtha. This amount of naphtha was not completely absorbed. Upon admixing 8 liters more water, the naphtha was completely absorbed. The resulting emulsion was smooth and creamy. It was dried at 85° C., giving a fluffy, brilliant product.

7. Lakes precipitated on an alumina hydrate substratum acting as a mordant, lend themselves well to drying by my method. A typical example of such lakes is peacock blue lake; a fairly concentrated lake made by precipitating dyes such as erioglaucine, alphazurine, neptune blue or patent blue, with aluminum and barium salts on an aluminum hydrate substratum.

A press cake (26.5 per cent solids) of peacock blue lake, admixed with additional water in the proportions 1500 grams press cake to 200 cc. water and emulsified with 400 cc. naphtha and 200 cc. additional water, in the manner described in connection with Example 6, dries quickly at 55° C. to give an excellent product.

8. Indanthrene or anthraquinone pigments (vat color pigments) can be dried by my method with improved results. In the case of indanthrene blue (press cake 19.2 per cent solids) 1500 grams press cake, 600 cc. water and 290 cc. naphtha are suitable proportions; emulsification and drying being effected as described in previous examples. Monastral blue (phthalo-cyanine blue) can be similarly treated and so can Indo-maroon; a condensation of two molecular proportions of 3-methyl, 4-chlorphenyl-thioglycollic acid.

The treatment of Indo-maroon illustrates the modification of the invention sometimes used wherein the press cake is first partially emulsified with naphtha, prior to adding water. Thus:

9. A batch of 1390 grams of a 28 per cent press cake of Indo-maroon was agitated, and 400 cc. naphtha stirred in. Partial emulsification took place. Upon incorporation of 400 ccm. of water, a smooth pasty emulsion was produced, which, dried at 54° C., gave a fine, smooth, soft mass.

The present invention effects improvement even in the case of inorganic pigments, which are in general more satisfactorily dried by ordinary methods than organic pigments. For example there may be taken the case of hydrated chromium oxide, a well known green pigment:

10. A batch of 2120 grams of a hydrated chromium oxide pulp (30 per cent solids) was agitated with 500 ccm. water to form a smooth suspension. Under increased agitation 300 cc. toluol was incorporated. A smooth emulsion formed, which dried at 58° C. to give a product much softer, fluffier and brighter than products made by drying and grinding the original press cake in known ways. Iron oxide pigments, and white pigments, can be treated in similar ways.

In all the examples the drying temperatures are well below that at which ebullition would take place. For example, the lowest boiling temperature of a mixture consisting of toluol and water is 84.5° C. at 766 mm.

Inorganic pigments commonly allow a greater latitude in choice of immiscible liquids than organic pigments, because bleeding or other actions of the liquid on the pigment do not take place.

In the case of certain pigments, upon emulsifying the smooth aqueous suspension with naphtha etc., the suspension immediately fluffs up into a fine lather, resembling whipped cream. The emulsion apparently absorbs air during the agitation. The increase in volume may amount to 50 per cent or more of the original volume. When this action takes place it is beneficial rather than disadvantageous, as it makes for additional softening up or separation of the pigment particles, and moreover seems to facilitate contact of the naphtha with the pigment particles. However, with some pigments this lathering does not occur, and while it is advantageous, it is not necessary in the successful operation of my method.

If desired, dispersing agents can be added to the suspension of emulsion, though such addition is not necessary and is often not desirable. Mostly I avoid use of dispersing agents since pigment preparations containing a dispersing agent are often not acceptable to the trade.

What I claim is:

1. A method of drying wet pigment pastes and press cakes to fine, uniform, non-caking preparations which comprises admixing the paste or press cake with the amount of water required to produce a smooth slurry, adding to the slurry a volatile organic water-immiscible liquid inert to the pigment, in amount sufficient to obviate formation of lumps in a subsequent drying step, but in amount less than would cause shedding of the pigment upon incorporation of said organic liquid in said slurry, emulsifying the organic liquid in said slurry to produce a homogeneous suspension, and exposing said suspension to heat in thin layers under drying conditions, the heating temperature being below that at which boiling occurs, whereby the water and immiscible liquid are successively removed yielding a dried fine pulveriform non-caking pigment preparation with particles of substantially the same degree of brilliancy and fine state of subdivision as in the original press cake or paste.

2. The method of claim 1 wherein the immiscible liquid is naphtha.

3. The method of claim 1 wherein the immiscible liquid is carbon tetrachloride.

4. A method of drying wet pigments to secure a fine pulveriform pigment preparation of substantially undegraded brilliancy and having the original fine particle size, which comprises producing a smooth free-running aqueous slurry of such pigment including enough water to isolate the particles, incorporating with the slurry by violent agitation a volatile, organic water-immiscible liquid which is inert to the pigment, whereby to form a homogeneous suspension, the amount of liquid added being sufficient to obviate formation of lumps or clumps in a subsequent drying step but less than would cause shedding of the pigment on incorporation of said organic liquid in said slurry, and subjecting the suspension to heat under drying conditions at a temperature below that at which boiling would occur, whereby the water and immiscible liquid are evaporated and removed, yielding a dry product as described.

5. A method of drying wet pigment pastes and press cakes to fine pulveriform non-caking products which comprises admixing such paste or press cake with water to form a smooth slurry, adding to the slurry a volatile, organic water-immiscible liquid which is inert to the pigment, the proportion of said liquid added being below that which would cause shedding of the pigment upon such incorporation but being sufficient to obviate clumping or lumping during a subsequent drying step, causing said immiscible liquid to partially emulsify with the slurry, adding additional water in amount sufficient to produce complete emulsification, and exposing the emulsion to heat under drying conditions, at a temperature below ebullition temperature, whereby the water and immiscible liquid are evaporated and removed, yielding a fine pulveriform pigment preparation preserving the original fine state of subdivision and pigmentary value of the wet press cake or paste.

6. A method of drying wet pigment pastes and press cakes with preservation of the individuality of the original particles, which comprises admixing such paste or press cake with water under agitation to form a smooth slurry, adding to the slurry a small amount of a water-immiscible organic liquid which is inert to the pigment, the amount being sufficient to obviate clumping of the pigment particles during a subsequent drying step, and not more than twice the amount of pigment on a dry weight basis, causing the immiscible liquid to emulsify throughout the slurry, and exposing the slurry to heat at a temperature below that which would result in ebullition but sufficient to evaporate and remove water and immiscible liquid in succession, yielding a dry pigment preparation substantially preserving the original fine state of subdivision and pigmentary value of particles of the wet press cake or paste.

7. A method of drying wet pigment pastes and press cakes to a fine, uniform, non-caking product, which comprises emulsifying such paste or press cake with water and an amount, less than the amount of water, of a volatile organic water-immiscible liquid inert to the pigment, under such conditions as to produce a smooth, homogeneous suspension, and exposing the suspension in thin layers to a current of hot air at a temperature below that at which boiling would occur, so as to successively drive off the water and the immiscible liquid, yielding a dried fine pulveriform non-caking pigment preparation of substantially the same degree of brilliancy and fine state of subdivision as the original press cake or paste.

VINCENT C. VESCE.